(12) United States Patent
Cheng et al.

(10) Patent No.: US 7,242,586 B2
(45) Date of Patent: Jul. 10, 2007

(54) SMALL FORM FACTOR TRANSCEIVER MODULE WITH INTEGRAL CAGE RETAINERS

(75) Inventors: Yung Chang Cheng, Tu-Chen (TW); Chung Hsing Mou, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 356 days.

(21) Appl. No.: 10/841,098

(22) Filed: May 7, 2004

(65) Prior Publication Data
US 2004/0223700 A1    Nov. 11, 2004

(30) Foreign Application Priority Data
May 7, 2003    (TW) .............................. 92208366 U

(51) Int. Cl.
*H05K 7/00* (2006.01)
(52) U.S. Cl. ..................... 361/728; 361/797; 361/800; 385/135; 385/136

(58) Field of Classification Search ............... 361/752, 361/790, 797, 800; 385/135–136, 88, 92–93
See application file for complete search history.

(56) References Cited

U.S. PATENT DOCUMENTS

| | | | |
|---|---|---|---|
| 6,655,995 B1 * | 12/2003 | Reisinger et al. ........... | 439/607 |
| 6,780,053 B1 * | 8/2004 | Yunker et al. .............. | 439/607 |
| 6,840,686 B2 * | 1/2005 | Jiang et al. .................. | 385/92 |
| 7,130,194 B2 * | 10/2006 | Togami et al. .............. | 361/715 |
| 2001/0024551 A1 | 9/2001 | Yonemura et al. | |
| 2002/0145856 A1 * | 10/2002 | Jones et al. ................. | 361/752 |
| 2003/0235375 A1 * | 12/2003 | Kamath et al. .............. | 385/92 |

* cited by examiner

*Primary Examiner*—Tuan Dinh
*Assistant Examiner*—Hung S. Bui
(74) *Attorney, Agent, or Firm*—Wei Te Chung

(57) ABSTRACT

A small form factor transceiver module includes a cage (1) and a transceiver (2). The cage has a top wall (11), and two sidewalls (12) and a rear wall (13) integrally formed with the top wall. The transceiver received in the cage has a printed circuit board (3) and at least one optical-electric diode electrically connected to the printed circuit board. The sidewalls have two bottom boards (121), each with a flange (120). A plurality of pins (123, 125, 133) is integrally formed with and extends from the bottom boards, the sidewalls and the rear wall.

17 Claims, 4 Drawing Sheets

SMALL FORM FACTOR TRANSCEIVER MODULE WITH INTEGRAL CAGE RETAINERS

BACKGROUND OF THE INVENTION

1. Field of the Invention

The present invention generally relates to transceiver modules, and more particularly to small form factor (SFF) transceiver modules.

2. Description of Prior Art

Transceivers are utilized to interconnect optical apparatuses and electronic modules for data transmission in optical communication systems. Electrical signals coming from electronic modules can be transformed into optical data and transferred to optical apparatuses by transceivers. Optical data coming from optical apparatuses also can be transformed into electrical signals and transferred to electronic modules by transceivers.

A transceiver is generally fixed in a printed circuit board (PCB) used in equipment such as host apparatuses, input/output systems, peripherals, and switchboards. The transceiver is received in a metal cage fixed in the PCB. The cage receiving the transceiver has two sidewalls, a rectangular top wall, a rear wall, and a plurality of pins for eliminating static electricity. The cage is utilized to prevent electro magnetic interference (EMI).

U.S. Pat. Pub. No. 2001/0024551 discloses a conventional SFF transceiver module. Referring to FIG. 5, a covering member receiving a transceiver is fixed in a mounting substrate by way of a terminal member 236. The terminal member 236 has a pair of connecting terminals 236a, a pair of side faces 236b, a bridge 236c, and a pair of fixing parts 236d, 236e. During assembly of the transceiver module, the transceiver is firstly received by the side faces 236b, the bridge 236c, and the fixing parts 236d, 236e. Secondly, the connecting terminals 236a are inserted into the mounting substrate to locate the transceiver. Finally, the covering member receives the transceiver for shielding and securing the transceiver.

However, since the connecting terminals 236a are separate from the covering member, the connecting terminals 236a need to be fixed individually before the covering member is put in place. In addition, the separate parts add to the complexity of the SFF transceiver module, and increase costs. Furthermore, the connecting terminals 236a are easily bent during assembly without the operator knowing, often resulting in faulty fixing of the connecting terminals 236a into the mounting substrate.

Accordingly, an SFF transceiver module which overcomes the above-described problems is desired.

SUMMARY OF THE INVENTION

An object of the present invention is to provide an SFF transceiver module which has a simple structure and which can be easily and reliably assembled.

To achieve the above object, an SFF transceiver module in accordance with the present invention includes a cage and a transceiver. The cage has a top wall, and two sidewalls and a rear wall integrally formed with the top wall. The transceiver received in the cage has a printed circuit board and at least one optical-electric diode electrically connected to the printed circuit board. The sidewalls have two bottom boards, each with a flange. A plurality of pins is integrally formed with and extends from the bottom boards, the sidewalls and the rear wall.

BRIEF DESCRIPTION OF THE DRAWINGS

Other objects, advantages and novel features of the present invention will be drawn from the following detailed description of a preferred embodiment of the present invention with attached drawings, in which.

DETAILED DESCRIPTION OF PREFERRED EMBODIMENT

Figure 1:
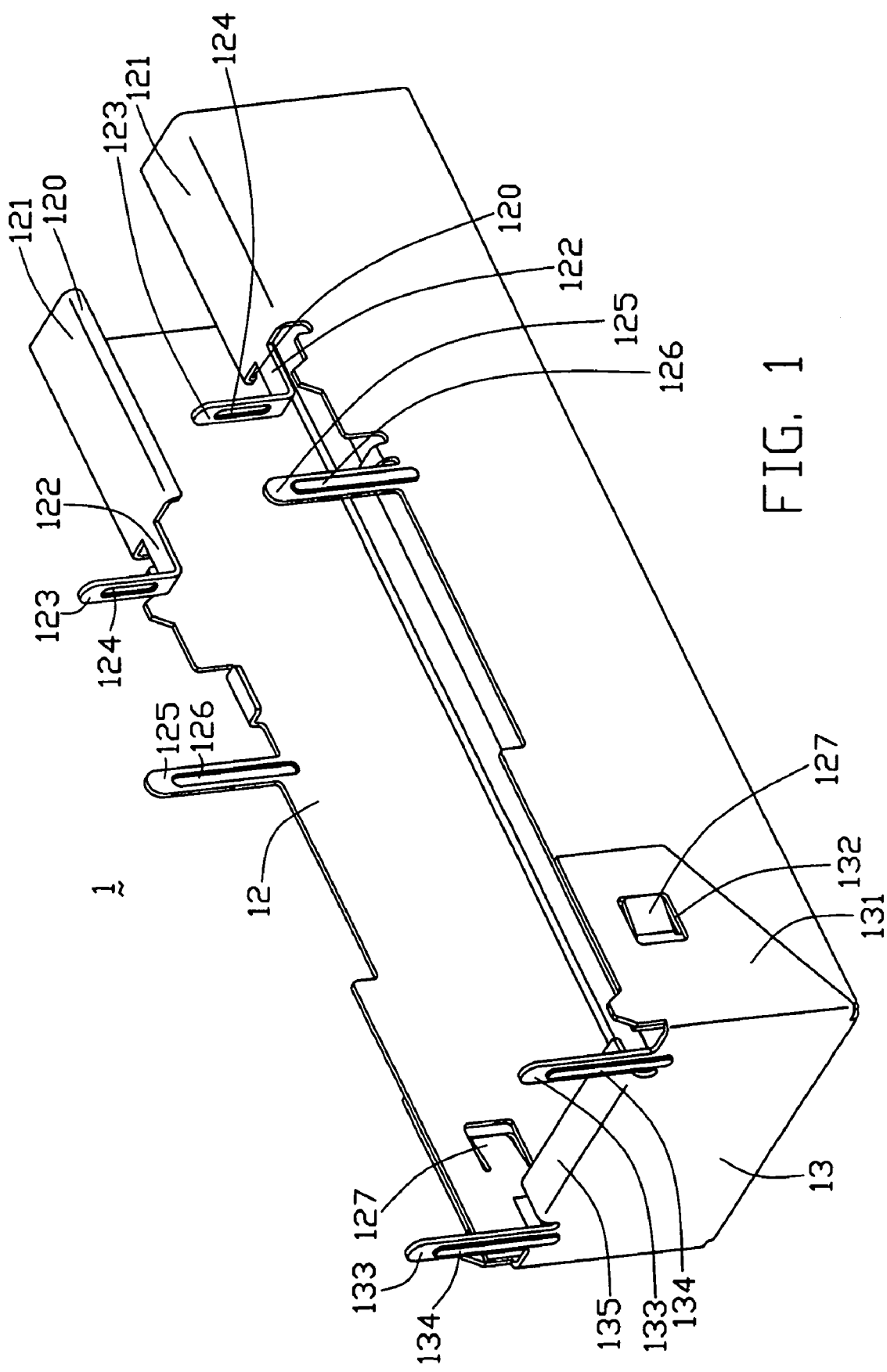
FIG. 1 is an isometric view of a cage of an SFF transceiver module in accordance with the present invention, showing the cage inverted.
Figure 2:
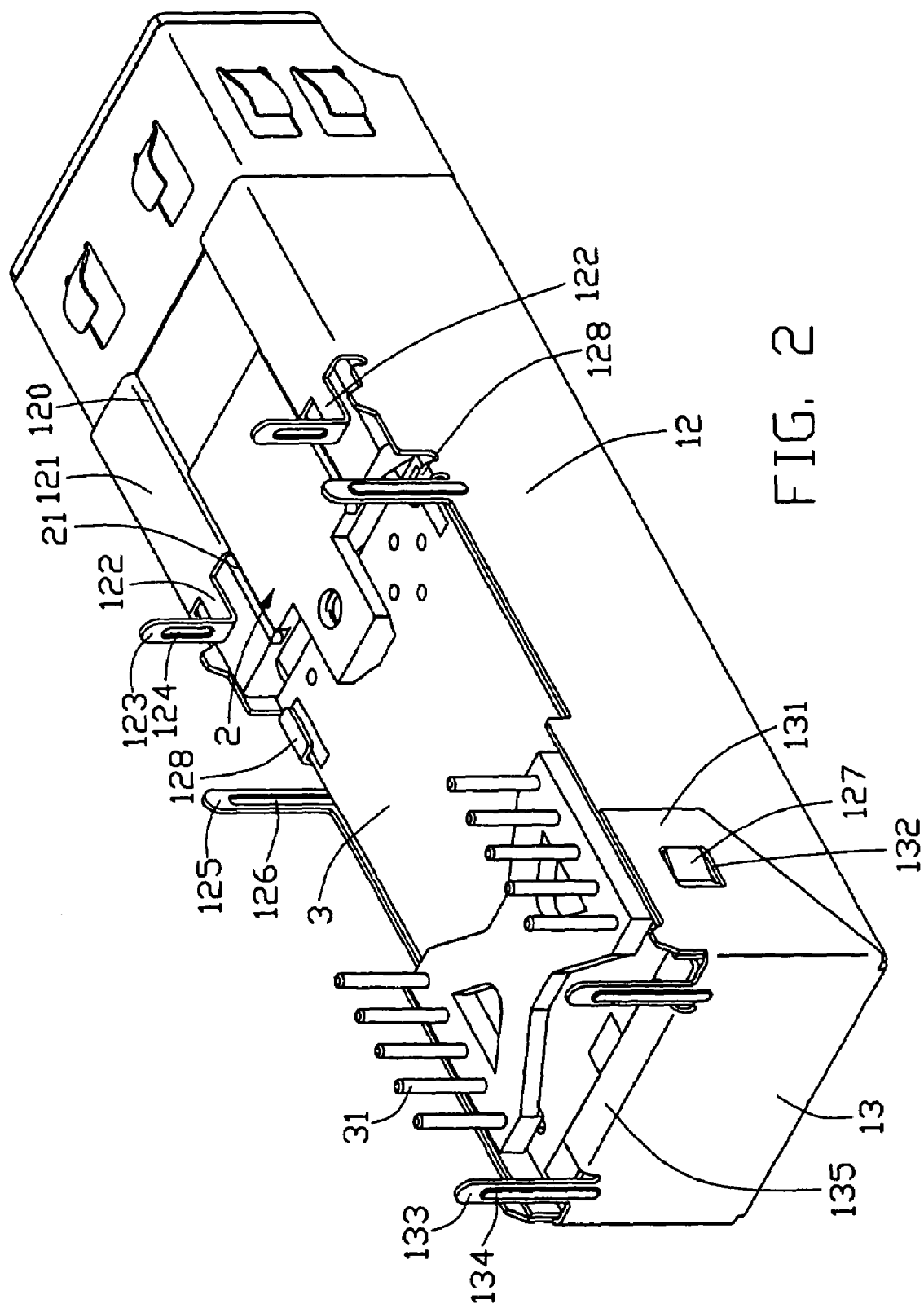
FIG. 2 is an isometric view of the SFF transceiver module in accordance with the present invention, showing the module inverted.

Referring to FIGS. 1 and 2, a small form factor (SFF) transceiver module in accordance with the present invention includes a cage 1 and a transceiver 2 received in the cage 1. The transceiver 2 has a first printed circuit board (PCB) 3 and at least one optical-electric diode (not shown) electrically connected to the first PCB 3. The first PCB 3 has a plurality of terminals 31 inserted into another host PCB (not shown). Optical data coming from an optical apparatus (not shown) can be transformed into electrical signals by the transceiver 2 and transmitted to the host PCB by the terminals 31. Electrical signals coming from the host PCB can be transformed into optical data by the transceiver 2 and transmitted to the optical apparatus.

Figure 3:
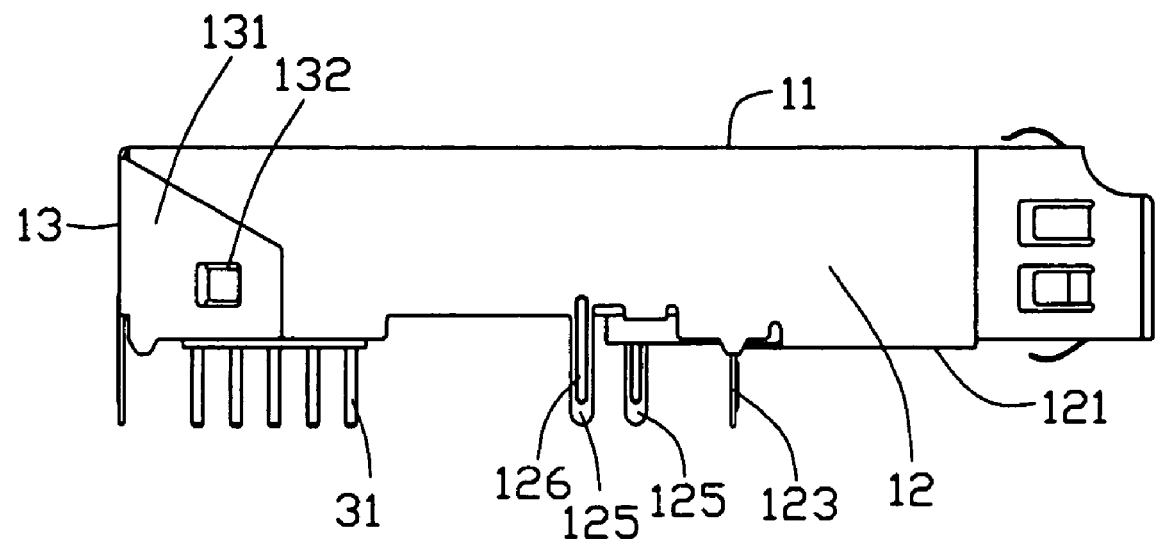
FIG. 3 is a side elevation of the SFF transceiver module of FIG. 2.
Figure 4:
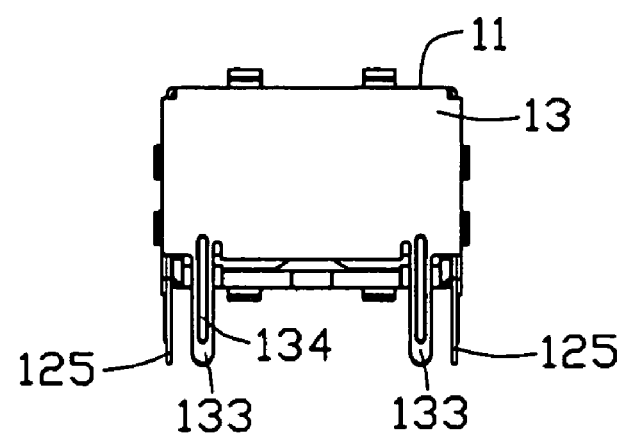
FIG. 4 is a rear elevation of the SFF transceiver module of FIG. 2.
Figure 5:
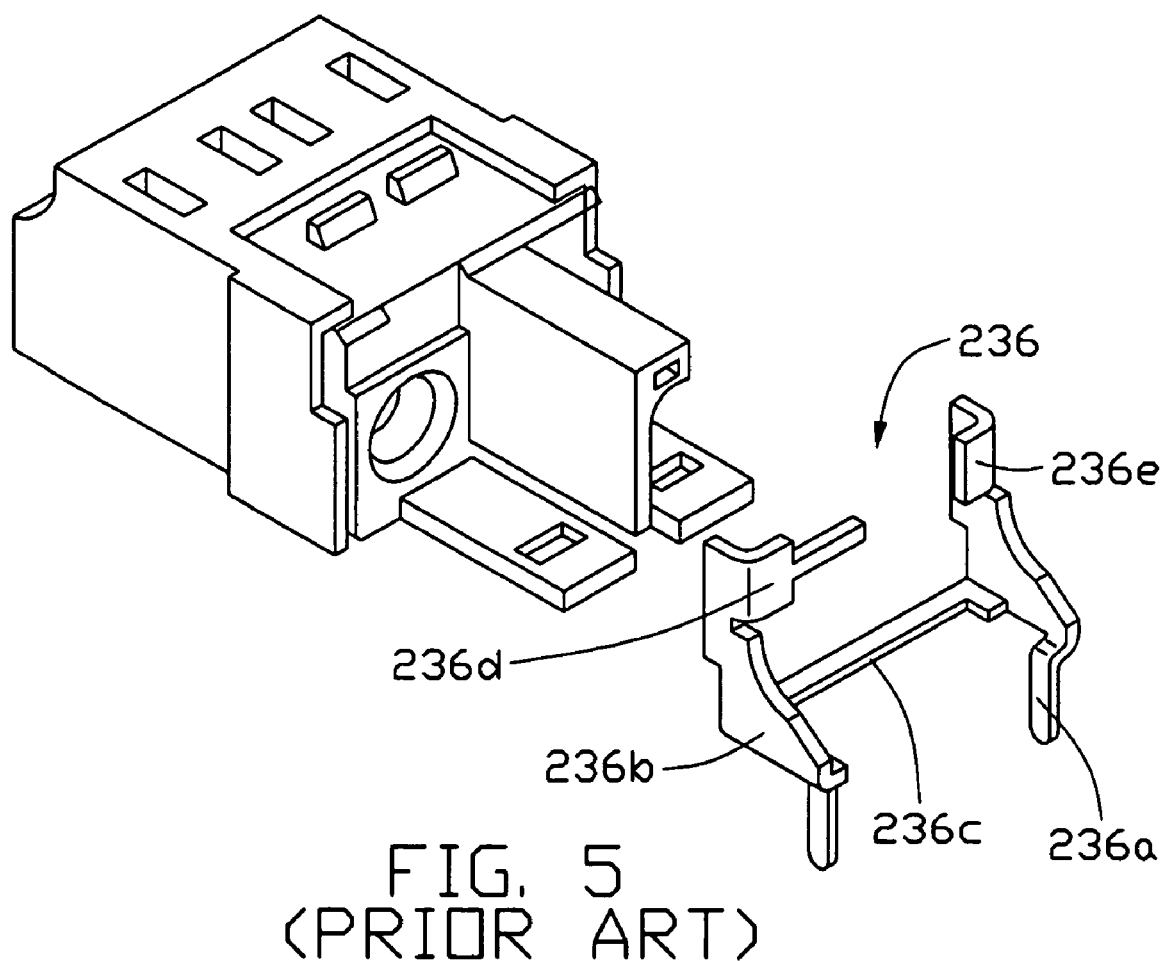
FIG. 5 is an isometric view of a receptacle member and a terminal member of a conventional SFF transceiver module.

Also referring to FIG. 3, the cage 1 is parallelepiped-shaped, and can be made of one piece or two pieces of metallic material. The cage 1 has a top wall 11, two sidewalls 12 and a rear wall 13. The top wall 11 is quadrate, and is integrally formed with the sidewalls 12 and the rear wall 13. Two clips 127 extend from rear ends of the sidewalls 12 respectively. Two flanks 131 extend from the rear wall 13 to cover the rear ends of the sidewalls 12 respectively. Each flank 131 defines a hatch 132 engagingly receiving a corresponding clip 127, so that the sidewalls 12 and the rear wall 13 are attached together. Two bottom boards 121 extend inwardly from front ends of the sidewalls 12 respectively. Each bottom board 121 has a flange 120, which extends vertically from a distal end of the bottom board 121 into an inside of the cage 1. Two stoppers 128 extend inwardly from middle parts of bottom edges of the sidewalls 12 respectively. A baffle 135 extends inwardly from a middle part of a bottom edge of the rear wall 13.

The cage 1 receives the transceiver 2 and the first PCB 3. The transceiver 2 defines two flutes 21 corresponding to the flanges 120. When the transceiver 2 is inserted into the cage 1, the flanges 120 slide in the flutes 21 and fasten the transceiver 2 in the cage at the same time. The flanges 120, the stoppers 128 and the baffle 135 cooperatively retain the transceiver 2 in the cage 1.

Two arms 122 respectively extend from the bottom boards 121 toward the rear wall 13. Two first pins 123 extend downwardly from distal ends of the arms 122 respectively. Two second pins 125 extend downwardly from the middle parts of the bottom edges of the sidewalls 12 respectively. Two third pins 133 extend downwardly from the bottom edge of the rear wall 13, at opposite sides of the baffle 135 respectively. The arms 122, the first and second pins 123, 125, and the sidewalls 12 are integrally formed. The third pins 133 and the rear wall 13 are integrally formed. That is, all the pins 123, 125, 133 integrally extend from the cage 1. This decreases the number of parts of the SFF transceiver module, which facilitates assembly and use of the SFF transceiver module (see next paragraph), and reduces costs.

The pins 123, 125, 133 are inserted into a second PCB (not shown), in order to support and ground the cage 1. A plurality of outer ribs 124, 126, 134 is extruded from the pins 123, 125, 133 respectively. The ribs 124, 126, 134 reinforce the pins 123, 125, 133, and facilitate stable and secure connection of the pins 123, 125, 133 to the second PCB.

Unlike in the conventional SFF transceiver module, the bottom boards 121, the flanges 120 and the pins 123 are integrally formed with the cage 1. The arms 122, the stoppers 128 and the baffle 135 are utilized to hold the transceiver 2, and the pins 123, 125, 133 are utilized to locate the cage 1 on the second PCB. The SFF transceiver module in accordance with the present invention has a simple structure, easy insertion of the transceiver 2 and first PCB 3 into the cage 1, and easy application.

Although the present invention has been described with reference to a specific embodiment, it should be noted that the described embodiment is not necessarily exclusive, and that various changes and modifications may be made to the described embodiment without departing from the scope of the invention as defined by the appended claims.

We claim:

1. A small form factor transceiver module comprising:
   a cage with a top wall, and two sidewalls and a rear wall integrally formed with the top wall; and
   a transceiver received in the cage, the transceiver comprising a printed circuit board and at least one optical-electric diode electrically connected to the printed circuit board, the printed circuit board comprising a plurality of terminals, the terminals configured for insertion into a host printed circuit board on which the cage is mounted to electrically connect the transceiver and the host printed circuit board;
   wherein two bottom boards respectively extend from lower edges of the sidewalls toward each other, each of the bottom boards comprises a flange vertically extending from a distal end thereof, the transceiver defines two flutes corresponding to the flanges, and the flanges are slidingly received in the flutes whereby the transceiver is fastened in the cage.

2. The small form factor transceiver module in accordance with claim 1, wherein two bottom boards respectively extend from lower edges of the sidewalls toward each other, and each of the bottom boards comprises at least one pin extending therefrom, the pins configured for securing the cage on the host printed circuit board.

3. The small form factor transceiver module in accordance wit claim 2, wherein each of the pins comprises at least one rib configured for stably securing the pin in the host printed circuit board.

4. The small form factor transceiver module in accordance with claim 1, wherein two clips extend from the sidewalls.

5. The small form factor transceiver module in accordance with claim 4, wherein two flanks extend from the rear wall to cover parts of the sidewalls, and each of the flanks comprises a hatch engagingly receiving the clip of a corresponding one of the sidewalls.

6. The small form factor transceiver module in accordance with claim 1, wherein two stoppers extend inwardly from middle parts of the sidewalls, and the stoppers retain the transceiver in the cage.

7. The small form factor transceiver module in accordance with claim 1, wherein a baffle extends inwardly from a middle part of the rear wall of the cage, and the baffle holds the transceiver.

8. A cage for receiving a transceiver, comprising:
   a top wall; and
   two sidewalls and a rear wall integrally formed with the top wall;
   wherein two bottom boards respectively extend from lower edges of the sidewalls toward each other, and each of the bottom boards comprises a flange vertically extending from a distal end thereof for retaining the transceiver in the cage, and at least one pin integrally formed therewith and extending therefrom.

9. The cage in accordance with claim 8, further comprising a plurality of pins integrally formed with and extending from the sidewalls and the rear wall.

10. The cage in accordance with claim 9, wherein each of the pins comprises at least one rib, and the ribs are configured for stably securing the pins in a host printed circuit board.

11. The cage in accordance with claim 8, wherein two clips extend from the sidewalls respectively.

12. The cage in accordance with claim 11, wherein two flanks extend from opposite sides of the rear wall to respectively cover portions of corresponding sidewalls, and each of the flanks comprises a hatch engagingly receiving the clip of the corresponding sidewall.

13. The cage in accordance with claim 8, wherein two stoppers extend inwardly from middle parts of the sidewalls, the stoppers configured for retaining the transceiver in the cage.

14. The cage in accordance with claim 8, wherein a baffle extends inwardly from a middle part of the rear wall, the baffle configured for holding the transceiver.

15. A cage assembly comprising:
   a top wall, two sidewalls and a rear wall commonly defining a space therein;
   a transceiver received in the space;
   a pair of spaced bottom boards integrally extending from lower edges of the two sidewalls toward each other under said space, and at least a pair of pins integrally downwardly extending from the corresponding bottom boards, respectively, for holding said bottom boards in position on a printed circuit board on which said cage assembly is mounted;
   wherein each of said bottom boards further includes an inner upward flange spaced from the corresponding sidewall and extending vertically from a distal end thereof.

16. The cage assembly in accordance with claim 15, wherein said transceiver defines two flutes corresponding to the upward flanges, and the upward flanges are slidably inserted into the flutes of said transceiver.

17. The cage assembly in accordance with claim 15, wherein each of the pins comprises at least one rib for stably securing the pin in the printed circuit board.

* * * * *